US006788036B1

(12) United States Patent
Milavec et al.

(10) Patent No.: US 6,788,036 B1
(45) Date of Patent: Sep. 7, 2004

(54) METHOD AND SYSTEM FOR CURRENT SHARING AMONG A PLURALITY OF POWER MODULES

(75) Inventors: Johann Ferdinand Milavec, Windisch (CH); Alain Chapuis, Morgan Hill, CA (US)

(73) Assignee: Ower-One Limited (KY)

( * ) Notice: Subject to any disclaimer, the term of this patent is extended or adjusted under 35 U.S.C. 154(b) by 0 days.

(21) Appl. No.: 10/401,463

(22) Filed: Mar. 28, 2003

(51) Int. Cl.$^7$ ............................................. G05F 1/40
(52) U.S. Cl. ........................................ 323/272; 323/237
(58) Field of Search ................................ 323/272, 237, 323/284, 285

(56) References Cited

U.S. PATENT DOCUMENTS

| | | | |
|---|---|---|---|
| 3,660,672 | A | 5/1972 | Berger et al. |
| 4,194,147 | A | 3/1980 | Payne et al. |
| 4,538,073 | A | 8/1985 | Freige et al. |
| 4,538,101 | A | 8/1985 | Shimpo et al. |
| 4,616,142 | A * | 10/1986 | Upadhyay et al. .......... 327/405 |
| 4,622,627 | A | 11/1986 | Rodriguez et al. |
| 5,053,920 | A | 10/1991 | Staffiere et al. |
| 5,073,848 | A | 12/1991 | Steigerwald et al. |
| 5,377,090 | A | 12/1994 | Steigerwald |
| 5,481,140 | A | 1/1996 | Maruyama et al. |
| 5,883,797 | A * | 3/1999 | Amaro et al. ................. 363/65 |
| 5,990,669 | A | 11/1999 | Brown |
| 6,191,566 | B1 | 2/2001 | Petricek et al. |
| 6,211,579 | B1 | 4/2001 | Blair |
| 6,421,259 | B1 | 7/2002 | Brooks et al. |
| 6,429,630 | B2 | 8/2002 | Pohlman et al. |
| 2001/0033152 | A1 | 10/2001 | Pohlman et al. |
| 2002/0073347 | A1 | 6/2002 | Zafarana et al. |
| 2003/0122429 | A1 | 7/2003 | Zhang et al. |
| 2003/0142513 | A1 | 7/2003 | Vinciarelli |
| 2003/0201761 | A1 | 10/2003 | Harris |
| 2004/0027101 | A1 | 2/2004 | Vinciarelli |

OTHER PUBLICATIONS

33702 Microprocessor Power Supply (3.0A) Analog Products MC33702 Fact Sheet; Motorola/Digital dna/Power Management Switching; pp. 1–4.
"Motorola Switch Mode Power Supply With Multiple Linear Regulators And High Speed CAN Transceiver" Motorola, Inc. 2002; digital dna; Analog Marketing; Rev. 2.5, Nov. 2002; 33394; Multi–Output Power Supply Semiconductor Technical Data.
"Power Management Solutions For Networking Applications" Presented by Luc Darmon Smart Networks Developer Forum 2003 —Jun. 4–6 Euro–Disney Paris, France; Motorola digital dna; www.motorola.com/sndf; pp. 1–26.
Preliminary Information 1.5 A Switch–Mode Power Supply With Linear Regulator 33701; Power Supply Integrated Circuit, Motorola Semiconductor Technical Data; Analog Marketing MC33701/D Rev. 1.0, May 2003; Motorola digital dna; pp. 1–24.

* cited by examiner

*Primary Examiner*—Shawn Riley
(74) *Attorney, Agent, or Firm*—O'Melveny & Myers LLP (57) ABSTRACT

A method and apparatus for sharing current among a plurality of power modules is provided. The method includes sensing of a characteristic of an output power signal of at least one of the plurality of power modules and providing a first signal having a pulse width corresponding to the sensed characteristic. The first signal is imparted onto a current share bus coupled to each of the plurality of power modules if the first signal has a pulse width greater than corresponding first signals of other power modules coupled to the current share bus, whereupon one of the first signals from the plurality of power modules having greatest pulse width is imparted onto the current share bus as a second signal. A phase difference between the first signal and the second signal is detected and a feedback signal is provided to the at least one power module in response to the detected phase difference. The feedback signal thereby controls the at least one power module to regulate the output power signal.

34 Claims, 11 Drawing Sheets

FIG. 5B
SIGNAL GENERATOR

METHOD AND SYSTEM FOR CURRENT SHARING AMONG A PLURALITY OF POWER MODULES

BACKGROUND OF THE INVENTION

1. Field of the Invention

The present invention relates generally to power supplies, and more particularly, to current sharing and equalization techniques among multiple DC-to-DC and AC-to-DC power modules.

2. Description of Related Art

It is often advantageous to implement a power system using a plurality of individual DC-to-DC or AC-to-DC power supplies connected in parallel. The DC power supplies may be stand-alone power supplies or may be power modules designed for integration into larger power supplies or power storage. ("Power supply" in this context conventionally refers to a voltage/current converter, not to the ultimate source of electric current such as a battery or generator). Unlike a single module power supply, the multi-module power system can provide for failure recovery if one module ceases to operate. Furthermore, simply supplementing the design with additional power supplies or power modules may increase the total current capacity of a multi-module power system. Often such power systems are used in telecommunications equipment and other equipment requiring a reliable source of power, e.g., matrix switches and industrial controllers.

Following Kirchhoff's voltage law, the total current delivered to a load from a power system having multiple power modules configured in parallel equals the sum of the currents delivered by each individual power module. In other words, the current supplied by each power module contributes to the total load current supplied by the power system. If one module delivers a greater amount of current, that module will also dissipate more power and therefore become hotter than the other power modules. Higher operating temperature normally yields reduced reliability of the overall power system. Therefore, there is a goal of evenly distributing the task of generating the total load current among parallel-connected power supplies or power modules.

Figure 1A:
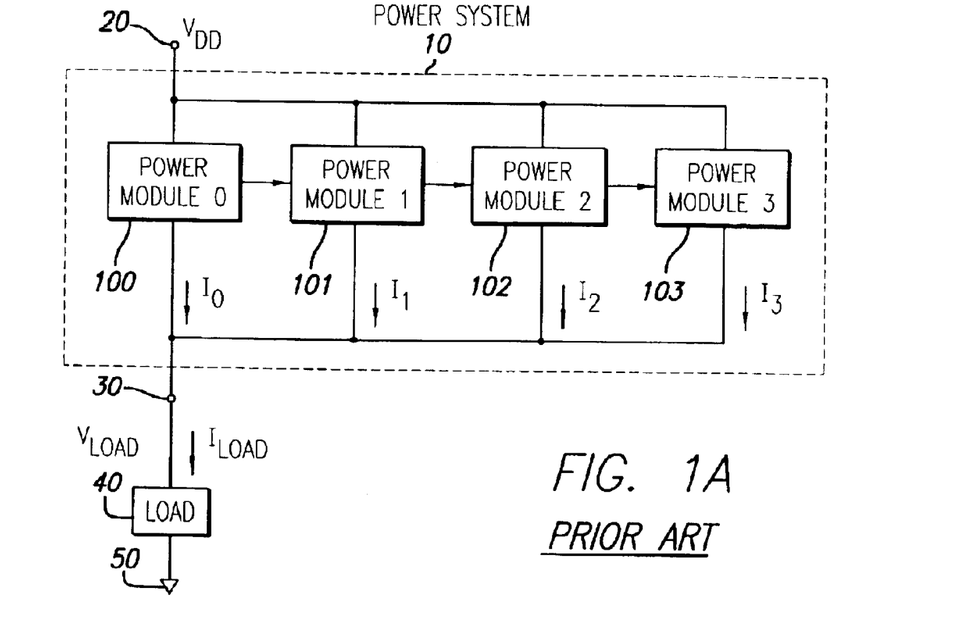
FIGS. 1A and 1B illustrate in block diagram form known power systems having multiple power modules configured in parallel to supply a load.
Figure 1B:
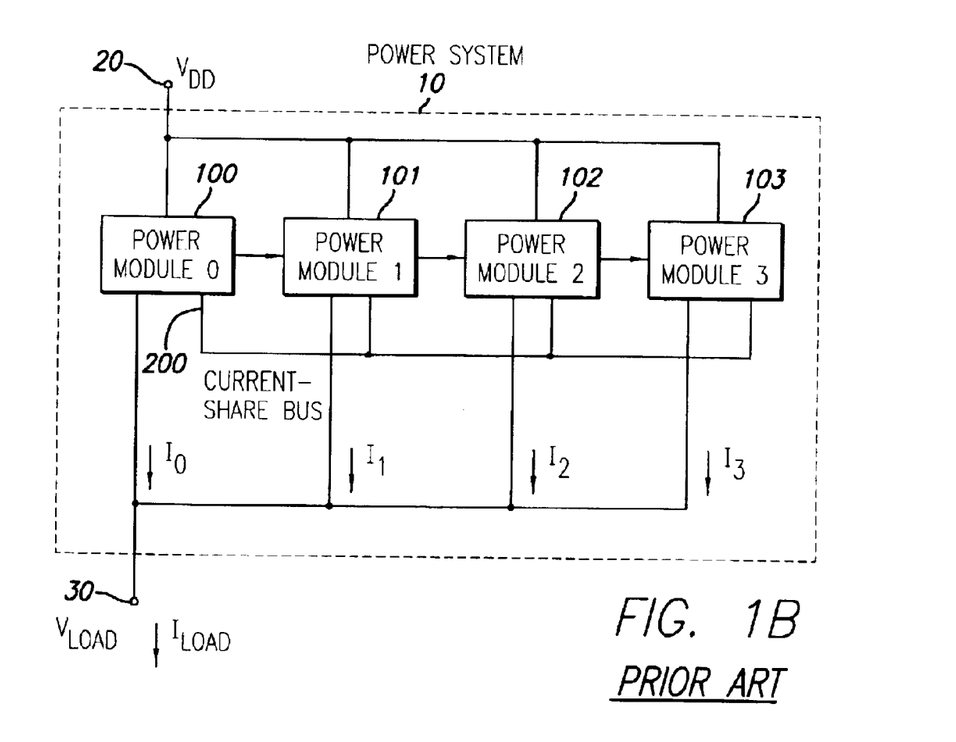

FIGS. 1A and 1B illustrate two different power system configurations, each using multiple power supplies. FIG. 1A illustrates a power system 10 having multiple power modules 100, 101, 102, 103 configured in parallel supplying power to a load 40. Each module accepts an input voltage $V_{DD}$ 20 and provides an output current $I_0$, $I_1$, $I_2$, $I_3$ to a power system output node 30. The sum of the individual module output currents is supplied to load 40. The total load current $I_{LOAD}=I_0+I_1+I_2+I_3$ results in a voltage $V_{LOAD}$ across the load referenced between output node 30 of power system 10 and a ground 50. Without some form of feedback control, power system 10 will be unable to control and equalize the currents $I_0$, $I_1$, $I_2$, $I_3$ supplied by respective modules 100, 101, 102, 103.

If the current supplied by the power system is evenly divided among the power modules, each power module will deliver an equal amount of power. By evenly dividing the task of providing power among the power modules, no one power module will be driven to an extreme that may cause power conversion inefficiencies, power module degradation or premature power module failure. To evenly distribute the power load among the plurality of power modules, an external controller may be used to sense and adjust each module's current output. Alternatively, the power modules may be designed to communicate among each other and self regulate their output power. For example, a power system may be designed such that each module communicates its current output to other power modules and each module adjusts its output based on the received signal.

Some power systems utilize a single wire or twisted pair configured as a shared bus to communicate the maximum current supplied by any one of the parallel-connected power modules. In these configurations, each of a plurality of power modules is connected to a shared bus. Each power module attempts to raise the voltage on the shared bus to a value indicative of the current supplied by that power module. The power module providing the greatest current to the load overrides the voltage provided by the other power modules. The voltage level on the shared bus therefore corresponds to a level indicating the current supplied by the power module providing the most current.

FIG. 1B illustrates a power system having such a current-share bus. The input node 20 and output node 30 of the power system are equivalent to those previously described with reference to FIG. 1A. Unlike FIG. 1A, each module 100, 101, 102, 103 in the power system 10 of FIG. 1B communicates with the other modules by way of a current-share bus 200. The current-share bus 200 may be a single wire providing a signal relative to a common ground of the power system 10.

As well as providing a voltage indicative of a power module's output current level, each power module also monitors the shared bus to determine the maximum current supplied by any one of the power modules. If each power module is providing the same amount of current to the load, the voltage applied to the current-share bus set by each module is equal to the voltage monitored by each module from the shared bus. Any power module providing a level of current below that which is indicated on the current-share bus will detect that at least one module is providing more current and thus more power than it is providing. A module providing less current than that indicated on the shared bus will incrementally increase its output voltage, which in turn will increase the current supplied to the load, until the current supplied by the power module equals the current indicated on the current-share bus. In this way, each of a plurality of parallel power modules will increase its output current in an attempt to track the output current supplied by the module providing the most current.

Each power module also monitors the output voltage supplied by the multi-module power system. As some power modules increase their current outputs, the total output voltage of the power system provided to the load may exceed the voltage demanded by the load. Each power module providing a current equal to the current indicated on the current-share bus will reduce its output current until the voltage provided to a load by the power system equals the desired voltage. With time, the power modules work in tandem to evenly distribute the current supplied by the power modules and to provide a regulated output voltage to the load. If the load's power demands change over time, the power modules track the changing demand by adjusting the current supplied by each module. If current sharing is operating properly, the resulting steady-state output currents $I_0$, $I_1$, $I_2$, $I_3$ of each respective module 100, 101, 102, 103 will be approximately equal to each another.

Figure 2A:
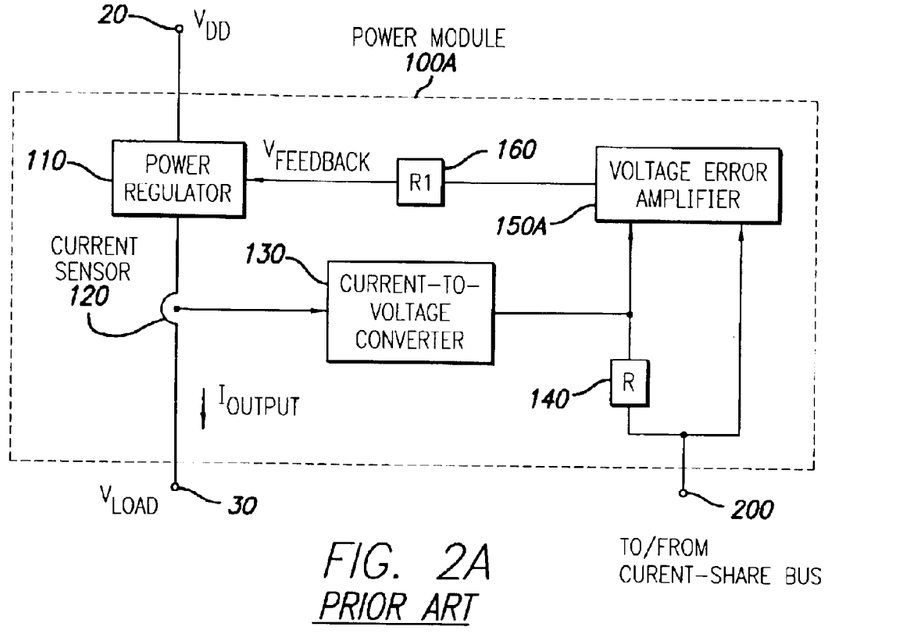
FIGS. 2A and 2B illustrate in block diagram form known power modules that communicate via a bus.
Figure 2B:
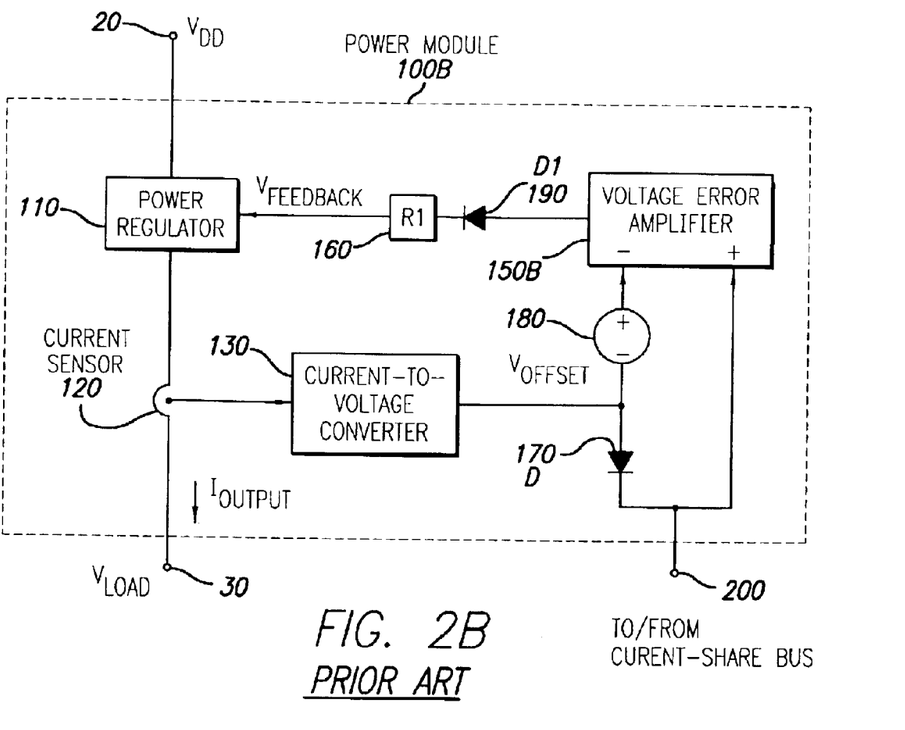

FIGS. 2A and 2B show examples of power modules that include circuitry allowing the modules to communicate via a shared bus. FIG. 2A shows a power module 100A that interfaces to a single-wire current-share bus that carries a shared analog signal representing an averaged signal. A plurality of power modules connected in parallel, such as the one shown in FIG. 2A, result in a voltage level on the current-share bus 200 that represents the average current of all of the modules.

Power module 100A includes a power regulator 110 and feedback circuitry including a current sensor 120, a current-to-voltage converter 130, interface circuitry 140 to the current-share bus 200, a voltage error amplifier 150A, and interface circuitry 160 to the power regulator 110. Power regulator 110 generates an output current $I_{OUTPUT}$. Power regulator 110 may be one of any of a number of power converter types, including for example, buck, boost, buck-boost or other current-providing power module well known in the art. Feedback circuitry in the power module, separate from any feedback circuitry within power regulator 110, provides a feedback voltage $V_{FEEDBACK}$ to power regulator 110. Power regulator 110 contains its own feedback circuitry (not shown) to control the output voltage of the power regulator. The feedback voltage $V_{FEEDBACK}$ alters the internal feedback circuitry of the power regulator 110 to provide current sharing, as will be further described below.

Current sensor 120 monitors the output of the power regulator 110 and provides a signal to current-to-voltage converter 130 indicative of the output current $I_{OUTPUT}$. Current-to-voltage converter 130 translates the signal indicative of the output current to an analog voltage level. This voltage level is coupled to one input of voltage error amplifier 150A. The voltage level is also passed through a resister 140, which is connected to current-share bus 200. Resistor 140 in combination with similarly situated resistors of other power modules (not shown) average the voltage levels supplied by each power module. The averaged voltage on current-share bus 200 represents the average current supplied by all of the power modules connected to current-share bus 200. The voltage residing on current-share bus 200 is supplied as a second input to voltage error amplifier 150A.

The voltage error amplifier 150A determines the difference between the output voltage of converter 130 and the average voltage level provided by current-share bus 200. If the difference is positive, the output current $I_{OUTPUT}$ is greater than the average current of the power modules. To equalize the output currents of each power module, voltage error amplifier 150A and resistor 160 generate a feedback voltage $V_{FEEDBACK}$ that directs power regulator 110 to adjust the output current. Power regulator 110 uses this feedback voltage $V_{FEEDBACK}$ to decrease the output voltage of the regulator.

Alternatively, if the difference between the input voltages is negative, the output current $I_{OUTPUT}$ is less than the average current of the power modules. To equalize the output current provided by each module, voltage error amplifier 150A will increase the feedback voltage $V_{FEEDBACK}$ provided through resistor 160. In response, power regulator 110 increases the output voltage, which in turn increases the output current $I_{OUTPUT}$. One drawback to this design is that if current-share bus 200 shorts to ground, each power module will drive its output voltage towards zero volts.

FIG. 2B shows another power module 100B that interfaces to a single-wire current-share bus that also carries a shared analog signal. A plurality of parallel-connected power modules connected to a common current-share bus 200, such as the power-module 100B shown in FIG. 2B, results in a voltage level on current-share bus 200 that represents the maximum current provided by any one of the power modules. The design of power module 100B functions substantially as described above with reference to power module 100A in FIG. 2A except, for example, the interface to current-share bus 200 and associated circuitry is modified. The voltage level provided by current-to-voltage converter 130 is passed through diode 170, which pulls up current-share bus 200 to at least the output voltage level of converter 130, assuming the voltage drop across diode 170 is negligible. If any one of the other power modules pulls current-share bus 200 to a value higher than the voltage level provided by converter 130 of module 100B, diode 170 will be reversed biased and current-share bus 200 will be unaffected by this power module. As a result, current-share bus 200 is held to the highest value produced by the power module generating the greatest output current.

Error amplifier 150B has two input signals: (1) a negative input providing a voltage level offset by $V_{OFFSET}$; and (2) a positive input providing the maximum voltage level sent to current-share bus 200 by all of the power modules. The first input signal is equal to the output voltage level of converter 130 increased by an offset voltage $V_{OFFSET}$. The offset in voltage helps to stabilize the feedback loop by helping to set a clear master, i.e., a power module that produces slightly more current than the other modules. If the resulting offset voltage level at the negative input is greater than the maximum voltage level riding on current-share bus 200, voltage error amplifier 150B provides a lower feedback signal $V_{FEEDBACK}$. In this case, diode 190 prevents passing of this feedback signal to power regulator 110 and the output voltage of regulator 110 remains unchanged. Alternatively, if the resulting voltage level at the negative input is less than the maximum voltage level on current-share bus 200, voltage error amplifier 150B provides a higher feedback signal $V_{FEEDBACK}$ through the serially connected diode 190 and resistor 160 thereby increasing the output voltage and in turn the output current $I_{OUTPUT}$ of power regulator 110.

Such known systems have additional drawbacks. First, a system using an analog shared bus communicating an amplitude signal is susceptible to line noise on the bus. Noise can be generated by sources within the power system itself or can be generated by energy radiating from the load or neighboring electronic circuitry. Noise on the current-share bus may erroneously drive the power modules to inaccurate and unpredictable output currents. Second, each power module might have a slightly different ground reference point. If a first power module has a lower ground reference than another power module, a voltage provided to the shared bus by the second power module will appear to the first power module as representing a larger current than actually exists. Third, parasitic resistances in the power module circuitry may reduce the actual voltage supplied to the current-share bus. Thus, the voltage supplied to the current-share bus by a power module may not accurately indicate the supplied output current by a power module.

Thus, it would be desirable to provide a current sharing and equalization technique for use with multiple DC-to-DC and AC-to-DC power modules that overcomes these and other disadvantages of the prior art.

SUMMARY OF THE INVENTION

According to embodiments of the present invention, methods and apparatus are provided for current sharing and equalization among a plurality of power modules configured in a parallel arrangement in a power system.

More particularly, a method of sharing current among a plurality of power modules is provided. The method includes sensing of a characteristic of an output power signal of at least one of the plurality of power modules and providing a first signal having a pulse width corresponding to the sensed characteristic. The first signal is imparted onto a current share bus coupled to each of the plurality of power modules if the first signal has a pulse width greater than corresponding first signals of other power modules coupled to the current share bus, whereupon one of the first signals from the plurality of power modules having greatest pulse width is imparted onto the current share bus as a second signal. A phase difference between the first signal and the second signal is detected and a feedback signal is provided to the at least one power module in response to the detected phase difference. The feedback signal thereby controls the at least one power module to regulate the output power signal.

In another embodiment, a power module is provided for operation with a plurality of like power modules connected together to provide a common output. The power module includes a power regulator providing an output power signal on a corresponding output terminal, and a bus interface adapted to communicate with a current share bus that is connected in like manner to each of the other power modules. The power module further includes a feedback loop adapted to sense the current level of the output power signal and provide a feedback signal to the power regulator in response thereto. The feedback signal thereby controls the power regulator to regulate the output power signal. The feedback loop further includes a converter adapted to provide a first signal having a pulse width corresponding to the sensed current level, and an error controller adapted to detect a phase difference between the first signal and a second signal received through the bus interface from the current share bus. The feedback loop imparts the first signal onto the current share bus if the first signal has a pulse width greater than corresponding first signals of the other power modules communicating with the current share bus, whereupon the first signal becomes the second signal.

A more complete understanding of a current share method and system will be afforded to those skilled in the art, as well as a realization of additional advantages and objects thereof, by a consideration of the following detailed description of the preferred embodiment. Reference will be made to the appended sheets of drawings, which will first be described briefly.

DETAILED DESCRIPTION OF THE PREFERRED EMBODIMENT

The present invention satisfies the need for a current sharing and equalization technique for use with multiple DC-to-DC and AC-to-DC power modules. Embodiments of the present invention and their advantages are best understood by referring to FIGS. 1 through 8 of the drawings, in which like numerals are used for like and corresponding parts of the various drawings. These drawings include symbolic representations used by those skilled in the art of power supply design that are most effective at conveying the teachings and discoveries to others skilled in the art.

Figure 3A:
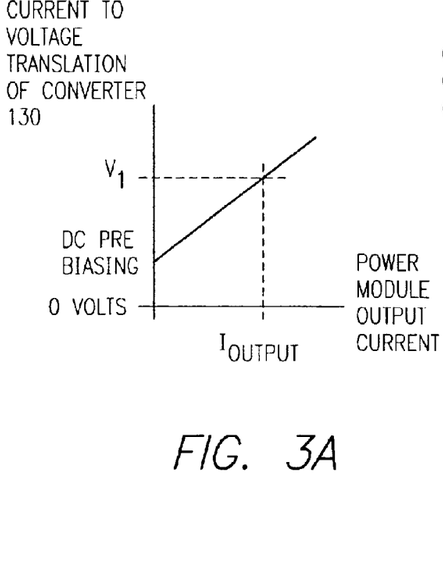
FIGS. 3A and 3B illustrate graphically a translation of a current signal to an amplitude signal of known power modules.
Figure 3B:
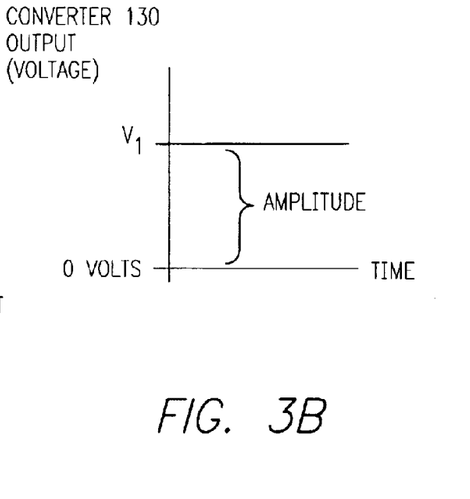

FIGS. 3A and 3B illustrate graphically one translation of a current signal to an amplitude signal utilized by known power modules of FIGS. 2A and 2B. For a given output current $I_{OUTPUT}$, current-to-voltage converter 130 (of FIGS. 2A and 2B) translates the current $I_{OUTPUT}$ to an output voltage level $V_1$. FIG. 3A shows the one-to-one mapping of a current value to a voltage value. FIG. 3B shows the output voltage $V_1$ of converter 130 over time where the input to converter 130 is the result of a constant output current value $I_{OUTPUT}$. If the output current changes with time, the output of converter 130 also changes to track the current changes.

Figure 3C:
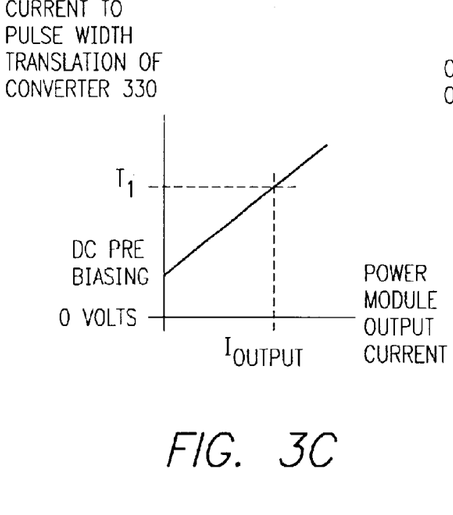
FIGS. 3C and 3D illustrate a translation of a current signal to a time based pulse signal according to some embodiments of the present invention.
Figure 3D:
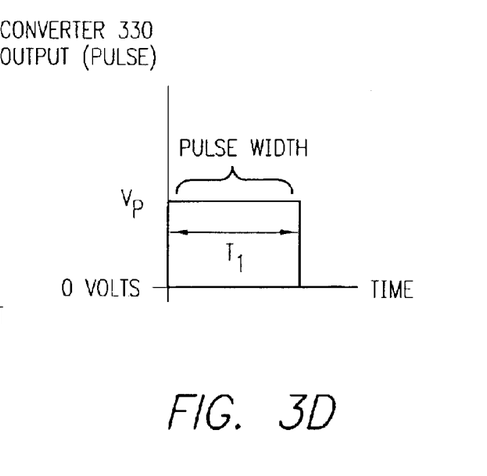

FIGS. 3C and 3D illustrate graphically a translation of a current signal to a time pulse signal in accordance with some embodiments of the present invention. For a given output current $I_{OUTPUT}$, a current-to-pulse width converter 330 (of FIG. 4A) translates the output $I_{OUTPUT}$ into an output pulse with period $T_1$. FIG. 3C shows the one-to-one mapping of a current value provided by a power module to a pulse having a pulse width of value $T_1$. FIG. 3D shows the output of converter 330 as a pulse having a fixed amplitude $V_p$ for a variable period $T_1$ and an amplitude of zero volts outside period $T_1$. Unlike the output of converter 130, which represents the instantaneous power module output current $I_{OUTPUT}$ and which might change with each instant of time, the output of converter 330 represents a single current value over a system synchronization period (e.g., $T_{SYNC}$). Each occurrence of a synchronization signal leads to the generation of a new pulse. If the output current is unchanged, the sequence of pulses will appear as a rectangular wave. Output of converter 330 represents the instantaneous current value at one point of the system period. The resulting pulse may be used to induce a time based pulse signal on a binary level current-share bus 200. A binary level current-share bus 200 operates at two values, e.g., $V_P$ volts and zero volts. As a result, the duration between low-high and high-low transitions on binary current-share bus 200 represents an output current level of a power module.

Figure 4A:
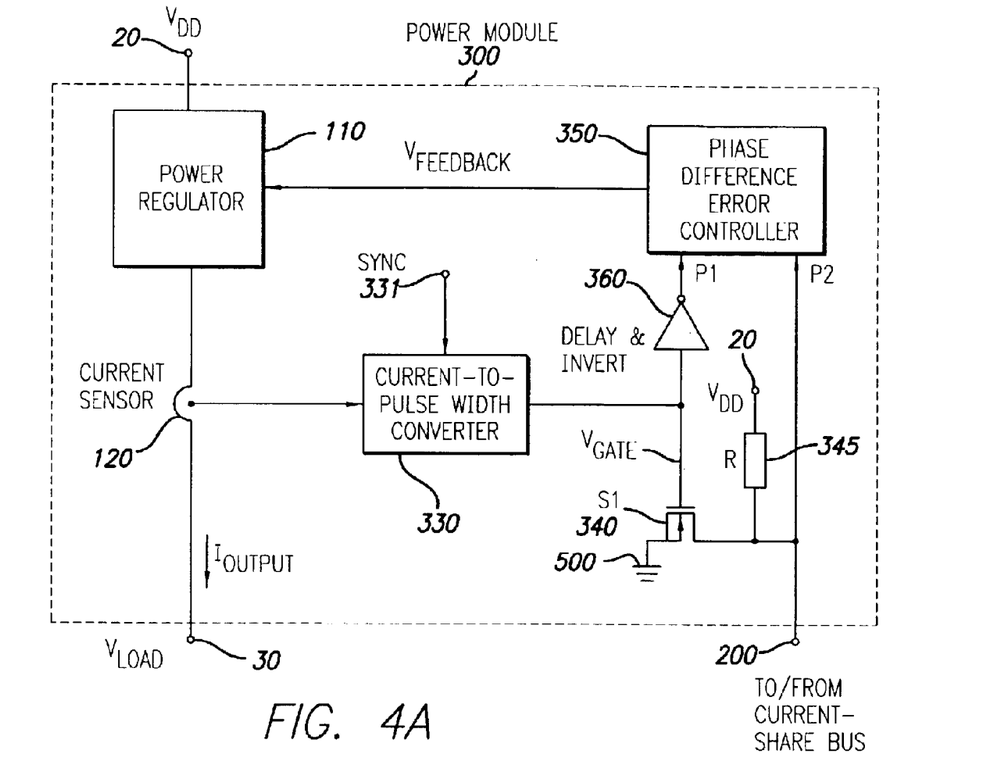
FIG. 4A shows a block diagram of a power module with interface circuitry to connect to a binary level current-share bus according to some embodiments of the present invention.

FIG. 4A shows a block diagram of a power module with interface circuitry for connecting to a binary level current-share bus 200 according to embodiments of the present invention. Amongst other differences, the current-to-voltage converter 130 of FIG. 2B is replaced with a current-to-pulse width converter 330. Based on the sensed current provided by current sensor 120, converter 330 generates a pulse $V_P(t)$ having a pulse width indicative of the output current $I_{OUTPUT}$ generated by power regulator 110. The pulse is used both as a gate control to a switch S1 340 and as an input to a delay and inverter circuit 360. When high, the pulse voltage $V_P(t)$ is applied to switch S1 340 as $V_{GATE}$, which enables switch S1 340 to conduction. When $V_P(t)$ is low, the voltage $V_{GATE}$ inhibits switch S1 340 from conducting. When enabled or closed, switch S1 340 shunts current-share bus 200 to a common ground 500, thereby pulling current-share bus 200 to a low level for at least the duration of the width of the pulse $V_P(t)$. If switch S1 340 of all power modules is open, there is no electrical path to ground 500. Resistor 345 connected to a high voltage thus pulls bus 200 to the high voltage since there is no electrical path to ground 500. Switch S1 340 may be any suitable switch well known in the art. FIG. 4A shows an enhanced mode MOSFET for switch S1 with its drain coupled to both bus 200 and pull-up resistor 345, its source coupled to common ground 500, its substrate region (body) coupled to the source, and its gate coupled to the output of converter 330. Alternatively, pull-up resistor 345 may be replaced by a current source.

The output of converter 330 is also provided to delay and invert circuitry (inverter) 360. Delay circuitry 360 aids in stabilizing the feedback control loop. The leading edge of the pulse is not necessarily delayed, however, the delay circuitry does delay the trailing edge of the pulse by a predetermined amount τ, thereby potentially increasing the total pulse width by the amount τ. Circuitry 360 also inverts the pulse such that the delayed and inverted pulse is comparable to the pulse received from current-share bus 200. Alternatively; the signal from the bus 200 may be inverted to provide comparable signals.

The output of circuitry 360 is provided as input P1 to a phase difference error controller 350. The phase difference error controller 350 also accepts a second input P2, which represents the signal provided by current-share bus 200. By comparing the trailing edges of the internal pulse from input P1 generated by delay and invert circuit 360 and the external pulse from input P2 received from bus 200, controller 350 determines whether feedback voltage $V_{FEEDBACK}$ should be adjusted up or down. Controller 350 may then adjust feedback voltage $V_{FEEDBACK}$ provided to power regulator 110. Power regulator 110 references $V_{FEEDBACK}$ to increase the output voltage. The operation of some embodiments of the phase difference error controller 350 is further described with reference to FIGS. 6 through 8 below.

Figures 4B, 5B:
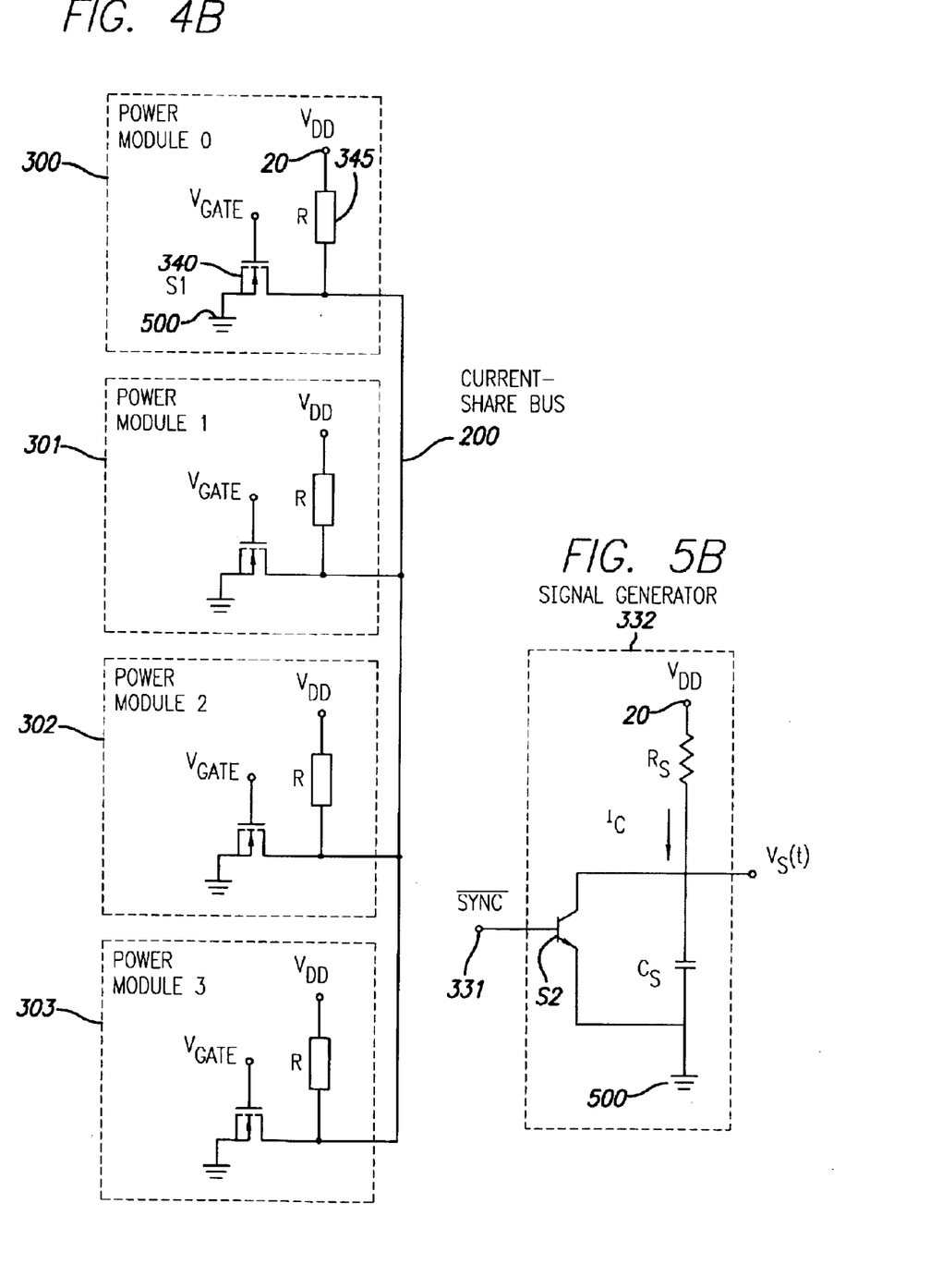
FIG. 4B shows schematically the binary level current-share bus interface circuitry of multiple power modules according to some embodiments of the present invention.
FIG. 5B shows schematically an embodiment of a signal generator according to some embodiments of the present invention.

FIG. 4B shows schematically the binary level current-share bus interface circuitry of multiple power modules 300–303 according to some embodiments of the present invention. The embodiment shows a wired-OR configuration. If the gate voltage for switch S1 340 of each power module 300–303 disables the switch S1, pull-up resistor 345 pulls current-share bus 200 to a high value. If any of switches S1 340 is closed, current-share bus 200 will have a direct path to common ground 500, thereby setting a low value on current-share bus 200. In sum, if any one of the switches S1 is on, bus 200 is low and bus 200 is high only if all of the switches are off. Though FIG. 4B shows four power modules, any number of power modules may be connected in the wired-OR (parallel) fashion shown. Additionally, only one of the modules need contain a pull-up resistor 345.

Alternatively, the interface circuitry may be reversed such that current-share bus 200 carries an inverted pulse to the one described above. In such configurations, a switch connects the bus to a high value when enabled. When disabled, the switch allows a pull-down resistor to hold the bus 200 low if no other power modules had an enabled switch.

Figure 4C:
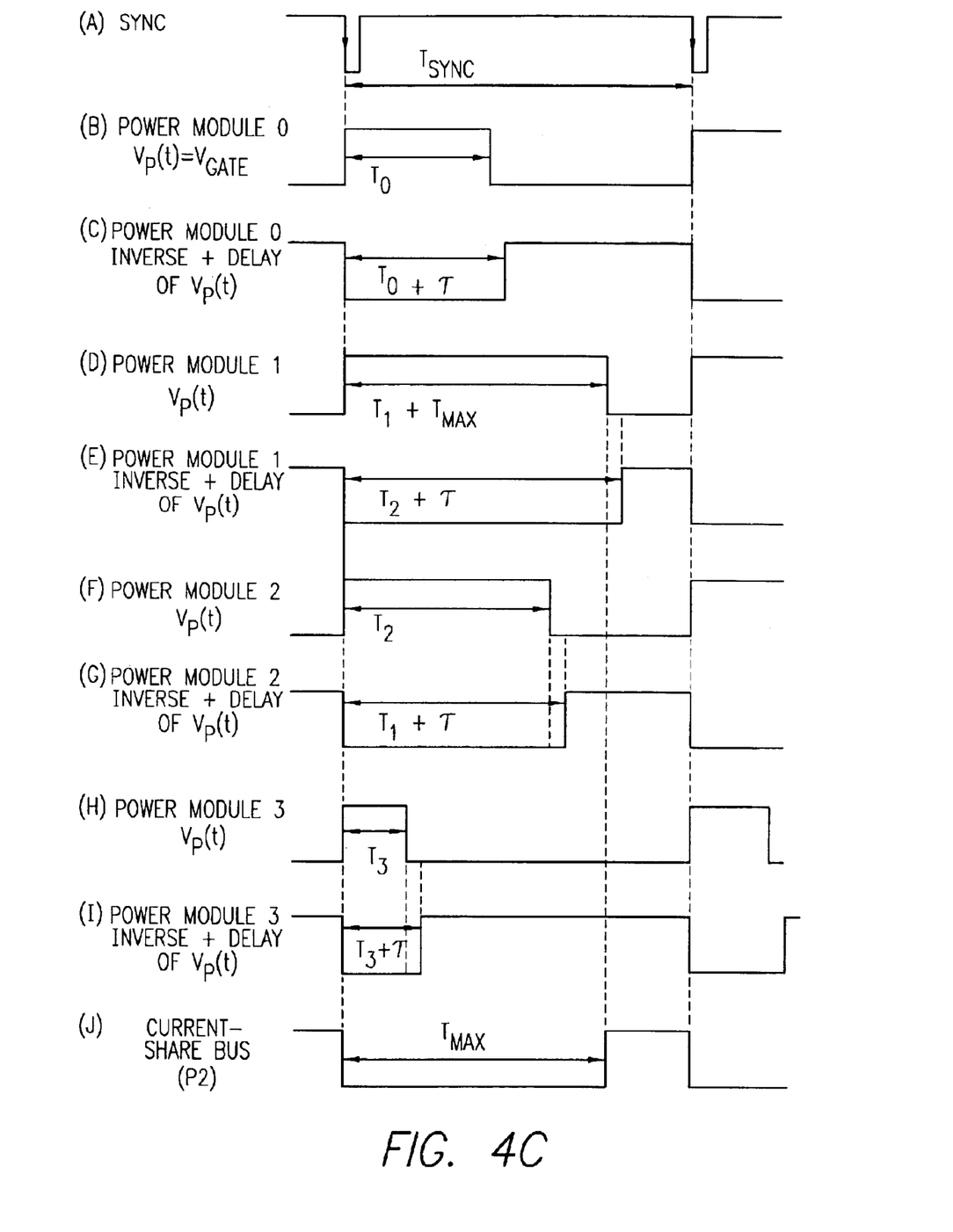
FIG. 4C shows an example of timing diagrams of inputs and outputs of multiple power modules connected to a binary level current-share bus according to some embodiments of the present invention.

FIG. 4C shows timing diagrams of one example of outputs from multiple power modules that are connected to a binary level current-share bus according to some embodiments of the present invention. Waveform (A) shows a periodic synchronization pulse SYNC. The power modules may use the synchronization pulse to initiate the pulse generated by converter 330. Alternatively, the SYNC signal may be the leading negative slope of the signal on the current-share bus. In this case, the controller running with the highest internal clock controls the share bus frequency and additional external circuitry to generate a synchronization signal may be discarded.

If the present invention is implemented with a single-wire shared bus, external circuitry to generate a synchronization signal is not required. In that case, one power module becomes the master, for example, the power module with the highest free-running frequency, or the first module to have an internal time expire. The master synchronizes all of the modules attached to the single-wire shared bus. The master supplies a signal to the bus from which each of the modules acquire timing. The falling edge of the signal on the shared bus may be considered a synchronization mark. The master may hold the shared bus low for a minimum duration to allow each of the attached power modules the opportunity to detect the falling edge transition. On detecting the falling edge on the shared bus signal, each module holds the shared bus low for a predetermined length of time. While the bus is held low by the modules, the bus provides a low signal to all modules. Even when only one module is holding the bus low, all of the modules will detect a low signal on the bus. Once the last module has released the bus, the signal on the bus transitions from a low to a high value. This rising edge is then used to achieve the current share function. Each of the modules detects this low-to-high transition and may use the timing of this transition in relation to the timing of its release of the bus to adjust internal parameters for module self regulation.

The following waveforms are referenced to the negative edge of the SYNC pulse. Waveform (B) shows the voltage $V_P$ that is generated by converter 330 of power module 0 and is applied to the gate of switch S1 340. Over time, the signal $V_P(t)$ appears as a sequence of pulses having pulse width $T_0$. Pulse width $T_0$ may change from pulse to pulse as the output current changes. Waveform (C) shows the resulting signal after the gate voltage $V_{GATE}$ passes through delay and invert circuitry 360. The trailing edge of the pulse is delayed by a predetermined amount τ and the entire signal is inverted. The resulting pulse has a pulse width of $T_0+τ$ if just the trailing edge is delayed and the leading edge is not delayed.

Similarly, waveforms (D), (F) and (H) show exemplary voltages $V_P$ generated by the converter 330 of power modules 1, 2 and 3, respectively. Over time, the voltages $V_P$ appear as a sequence of pulses having pulse widths $T_1$, $T_2$ and $T_3$. Waveforms (E), (G) and (I) show the resulting signal after the voltages $V_P$ pass through delay and invert circuitry 360. Again, the trailing edges of the pulses are delayed by a predetermined amount $\tau$ and each signal is inverted. The resulting negative pulses have respective pulse widths of $T_1+\upsilon$, $T_2+\upsilon$ and $T_3+\upsilon$.

Waveform (J) shows an example of a signal imposed on current-share bus 200 by the combination of the example pulses generated by the power modules. The duration $T_{MAX}$ of the pulse on current-share bus 200 has a duration that is equal to the maximum of $T_0$, $T_1$, $T_2$ and $T_3$. In this example, the pulse generated by power module 1 is longer than each of the other pulses generated by the remaining power modules. The voltage $V_P(t)$ enables the switch 340 of power module 1 for the duration of the pulse width $T_1$. Thus, current-share bus 200 is held low by power module 1 for a time $T_{MAX}=T_1$.

Figure 5A:
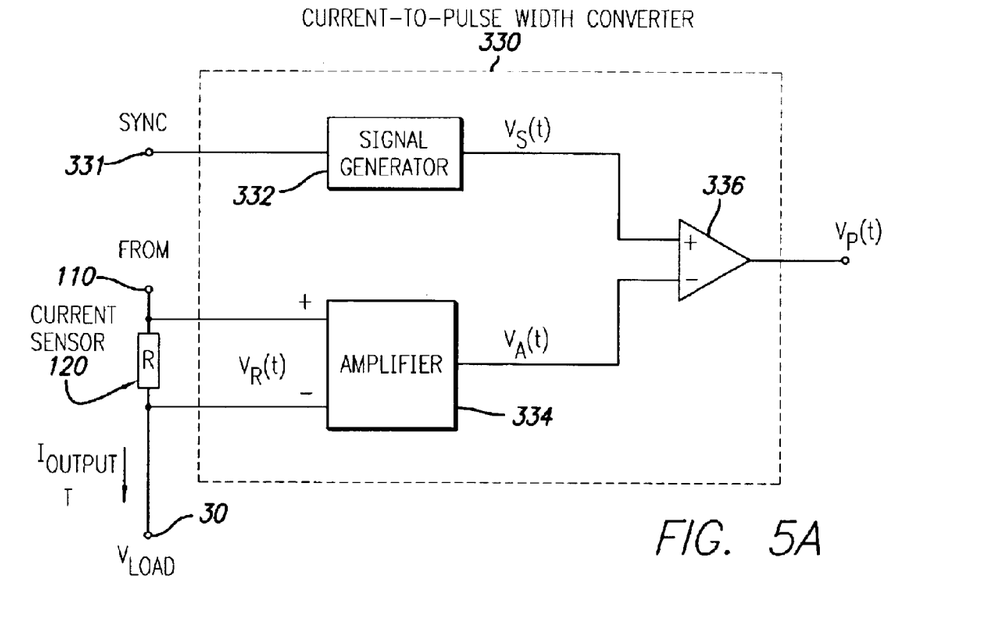
FIG. 5A shows a block diagram of an embodiment of a current-to-pulse width converter according to some embodiments of the present invention.

FIG. 5A shows a block diagram of an embodiment of a current-to-pulse width converter 330 of FIG. 4A according to some embodiments of the present invention. Current-to-pulse width converter 330 incorporates a signal generator 332, an amplifier 334 and a comparator 336. The converter 330 has an input for a synchronization pulse SYNC 331, an input for a signal from a current sensor 120, and an output $V_P(t)$. The signal generator 332 accepts a SYNC signal 331, which is used to synchronize the generation of pulses among multiple power modules. Signal generator 332 provides a periodic one-to-one signal $V_S(t)$. For example, a saw-tooth signal may be used. Although saw-tooth signals provide a linear one-to-one signal over a period of one cycle, a linear signal is not necessary.

The output of signal generator 332 is coupled to a first input of comparator 336. Amplifier 334, connected in parallel to signal generator 332, accepts a potential $V_R(t)$, which is the potential across a resistor R of current sensor 120 and is indicative of the current provided by power regulator 110. The output $V_A(t)$ of the amplifier 334 is a scaled representation of the output current $I_{OUTPUT}$ and provides a second input to comparator 336. Comparator 336 generates a signal $V_P(t)$ that is low while $V_S(t)$ is lower than $V_A(t)$ and is high while $V_S(t)$ is greater than $V_A(t)$.

FIG. 5B shows an embodiment of a signal generator 332 according to some embodiments of the present invention. Signal generator 332 has a charging capacitor $C_S$ coupled to a low voltage potential, e.g., common ground 500, coupled in series with a pull-up resistor $R_S$ and in parallel to switch S2. One end of the pull-up resistor $R_S$ is coupled to capacitor $C_S$ and the other end is coupled to a high voltage 20, e.g., $V_{DD}$. Switch S2 may be any suitable switch, e.g., a bipolar transistor, as shown. Signal generator 332 charges capacitor $C_S$ while switch S2 is open thereby providing an increasing voltage to output $V_S(t)$. When switch S2 is closed, the charge in capacitor $C_S$ is quickly drained, thus providing a low voltage to output $V_S(t)$. The resulting increasing and quickly decreasing signal repeat with the frequency of the SYNC signal 331, thereby generating a periodic saw-tooth signal. The resistors act as an inexpensive current source providing a current Ic. The voltage $V_S(t)$, which starts from zero, is given by the following equation:

$$V_S(t) = \frac{I_C t}{C_S}$$

wherein t represents time.

Figure 5C:
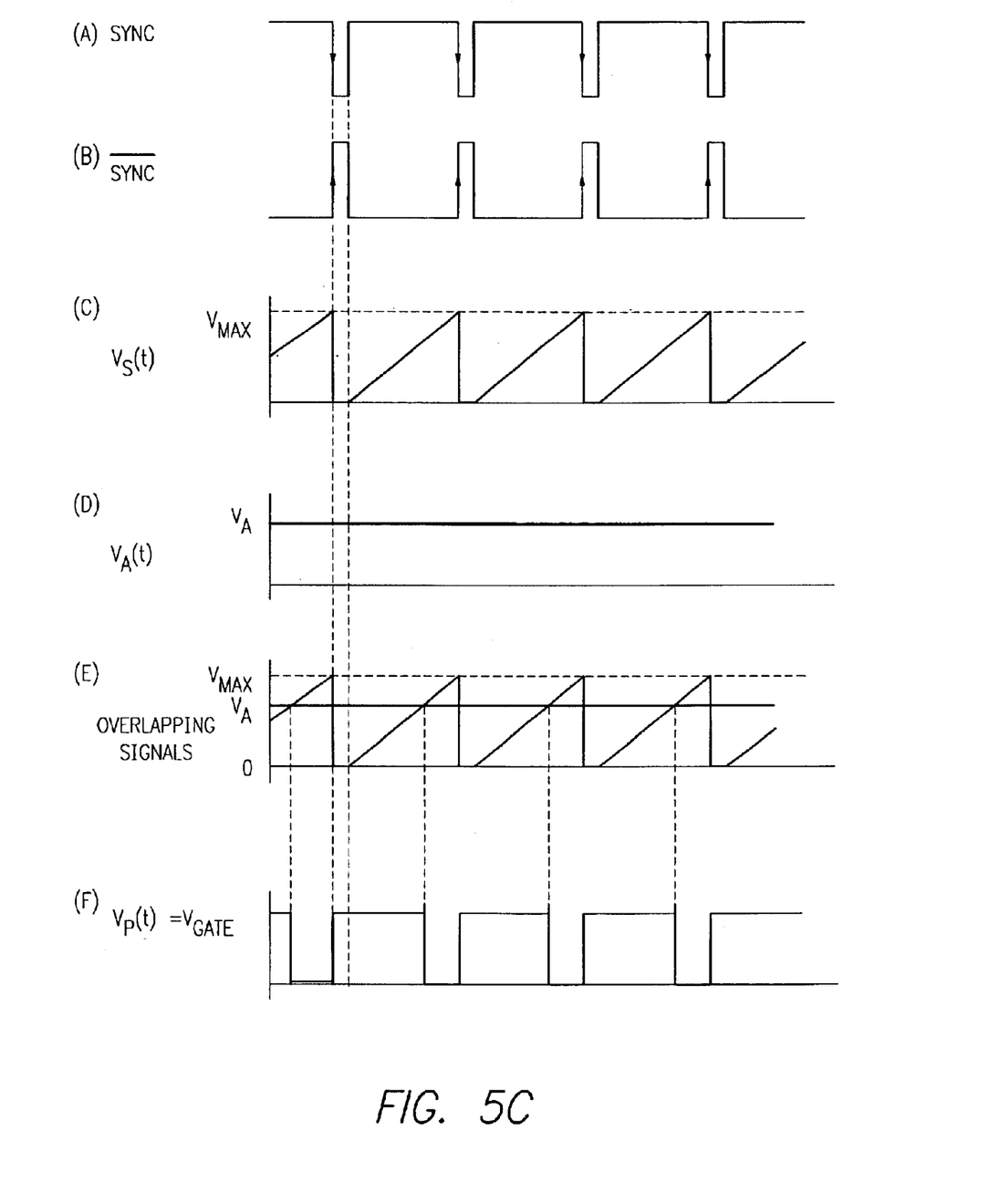
FIG. 5C shows timing diagrams of internal, input and output signals of a current-to-pulse width converter according to some embodiments of the present invention.

FIG. 5C shows various waveforms related to the exemplary circuitry shown in FIGS. 5A and 5B. Waveforms (A) and (B) show a SYNC pulse and its inverse, respectively. Waveform (C) shows $V_S(t)$ generated by signal generator circuitry 332 of FIG. 5B. The saw-tooth like pattern increases gradually as switch S2 is open and capacitor $C_S$ charges. The signal then falls to zero when switch S2 closes as a result of the SYNC signal going low. Waveform (D) shows a signal $V_A(t)$, which is a scaled version of current sensor signal $V_R(t)$ and whose amplitude is indicative of the instantaneous output current $I_{OUTPUT}$.

Waveform (E) overlaps waveforms (C) and (D) to illustrate the points at which $V_S(t)$ of waveform (C) intersects with $V_A(t)$ waveform (D). Waveform (F) shows $V_P(t)$, which is applied to the gate of switch S1 340 of FIG. 4A. The signal $V_P(t)$ is high when $V_S(t)$ is lower than $V_A(t)$ and low when $V_S(t)$ is greater than $V_A(t)$. The resulting pulse $V_P(t)$ has a pulse width that is indicative of the output current $I_{OUTPUT}$ during the present period.

The output $V_P(t)$ of current-to-pulse width converter 330 passes through a delay and invert circuit 360, which in turn provides a first input P1 to phase difference error controller 350. A second input P2 to controller 350 is provided by current-share bus 200. The controller 350 generates a feedback voltage $V_{FEEDBACK}$, which is used by the power regulator 110 to adjust the overall output voltage of power module 300.

Figure 6:
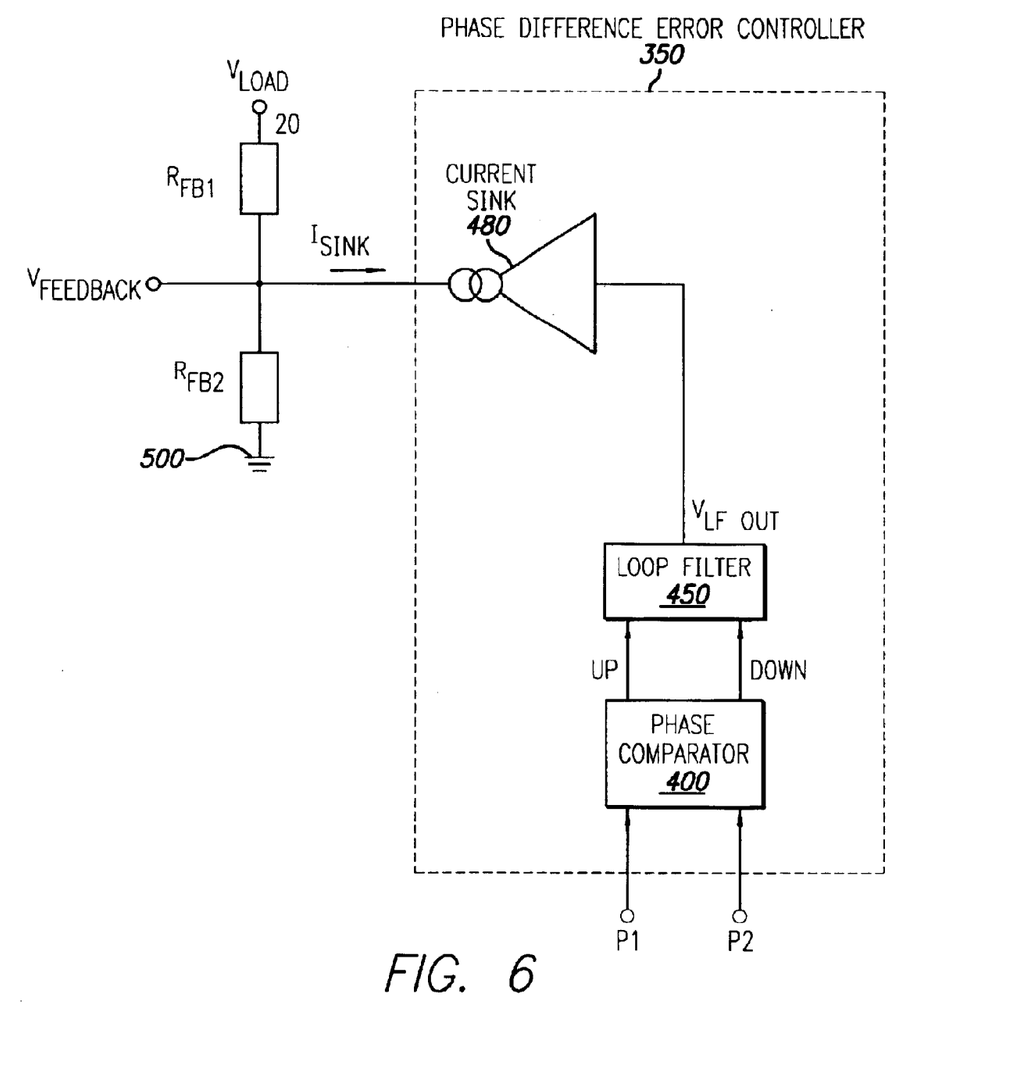
FIG. 6 shows a block diagram of a phase difference error controller according to some embodiments of the present invention.

FIG. 6 shows a block diagram of a phase difference error controller 350 according to some embodiments of the present invention. Phase difference error controller 350 has a phase comparator 400 coupled to two inputs P1 and P2, a loop filter 450 accepting outputs from phase comparator 400, and a current sink 480 accepting an output from loop filter 450. After comparing the trailing edges of P1 and P2, phase comparator 400 generates either an UP signal or a DOWN signal. The UP signal indicates that the output current $I_{OUTPUT}$ is below a desired level. Similarly, the DOWN signal indicates that the output current $I_{OUTPUT}$ is above the desired level.

Loop filter 450 may be used to convert the UP and DOWN signals to shape the loop gain of the current share feedback loop and to provide a control voltage $V_{LF\_OUT}$. The loop filter output voltage $V_{LF\_OUT}$ is used to control current sink 480. Based on the loop filter output voltage $V_{LF\_OUT}$, current sink 480 draws an amount of current $I_{SINK}$ from a voltage divider network with the power regulator 110. The voltage divider, comprised of resistors $R_{FB1}$ and $R_{FB2}$, may be incorporated within power regulator 110 or may be placed between controller 350 and regulator 110. The resistors $R_{FB1}$ and $R_{FB2}$ sense the output voltage $V_{LOAD}$ of the power regulator 110 so that the feedback voltage $V_{FEEDBACK}$ corresponds to the output voltage $V_{LOAD}$.

As current $I_{SINK}$ increases above zero Amperes, the voltage drop across $R_{FB1}$ decreases the feedback voltage $V_{FEEDBACK}$, which in turn causes the output voltage feedback controller in the power train to increase its output voltage. Since the current source 480 only sinks current, the output voltage can only be increased. In sum, by comparing the phase difference between inputs P1 and P2, phase difference error controller 350 provides a feedback voltage $V_{FEEDBACK}$ that tends to drive the output current of power module 300 to a value indicated on bus 200.

Figure 7A:
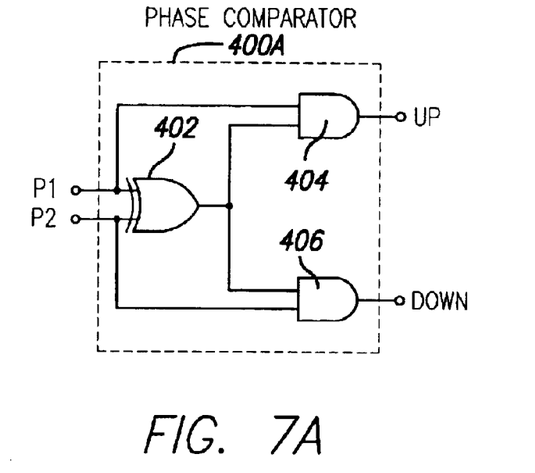
FIGS. 7A and 7B show schematically two embodiments of a phase detector according to some embodiments of the present invention.
Figure 7B:
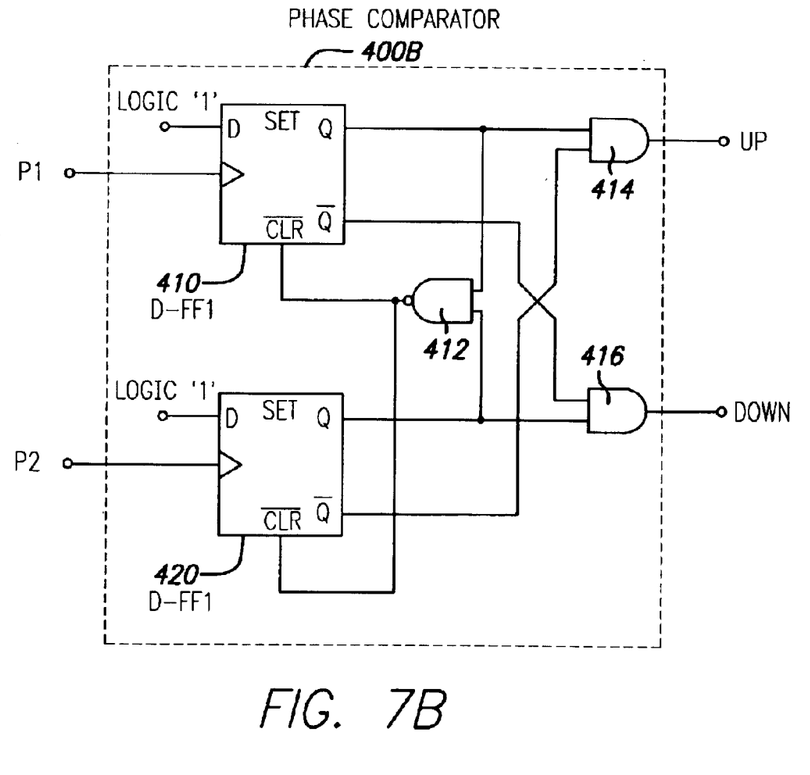

FIGS. 7A and 7B show schematically two embodiments of a phase comparator according to some embodiments of the present invention. The two inputs P1 and P2 of phase comparator 400A are inputs of an exclusive-OR gate 402. The output of XOR gate 402 is provided to two AND gates 404 and 406. Input signal P1 is also an input to AND gate 404, which provides an UP signal output of phase comparator 400A. Similarly, input signal P2 is also an input to AND gate 406, which provides a DOWN signal output of phase comparator 400A. Assuming the leading edges of inputs P1 and P2 are not coincidental, the XOR and AND gates provide an UP signal while P1 is HIGH and P2 is LOW. Similarly, the gates provide a DOWN signal while P2 is HIGH and P1 is LOW.

FIG. 7B shows another embodiment of a phase comparator 400. Phase comparator 400B accepts inputs P1 and P2 having leading edges that are not necessarily coincidental. The first input P1 is used to clock a first D flip-flop 410 having its D input set to logic 1. In a 5 volt system, logic 1 is represented by voltage level of 5 volts. The Q output of flip-flop 410 is used as an input to an AND gate 414 and to a NAND gate 412. The negative Q output of 410 is used as an input to an AND gate 416. The second input P2 is used to clock a second D flip-flop 420 having its D input set to logic 1. The Q output of flip-flop 420 is used as an input to AND gate 416 and to NAND gate 412. The negative Q output of flip-flop 420 is used as an input to AND gate 414. AND gate 414 provides an UP pulse when the positive slope of P1 is leading the positive slope of P2. Similarly, AND gate 416 provides a DOWN pulse when the positive slope of P2 is leading the positive slope of P1. Both the UP and DOWN signals are reset by NAND gate 412 feeding a clear signal to both flip-flops 410 and 420.

Figure 7C:
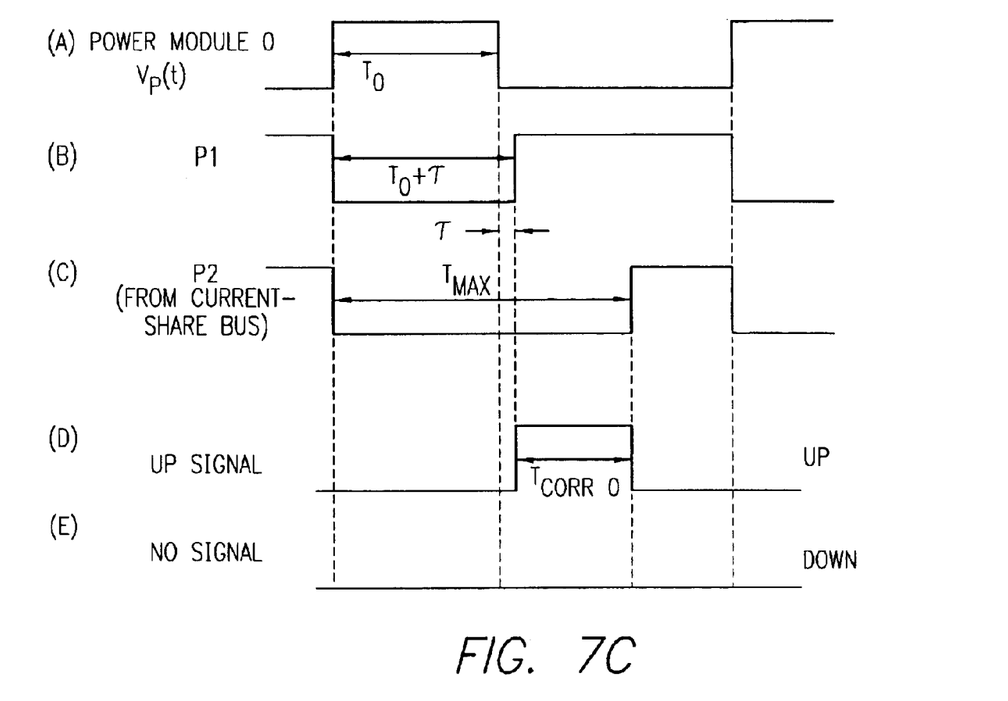
FIGS. 7C and 7D show timing diagrams for a phase detector according to some embodiments of the present invention.
Figure 7D:
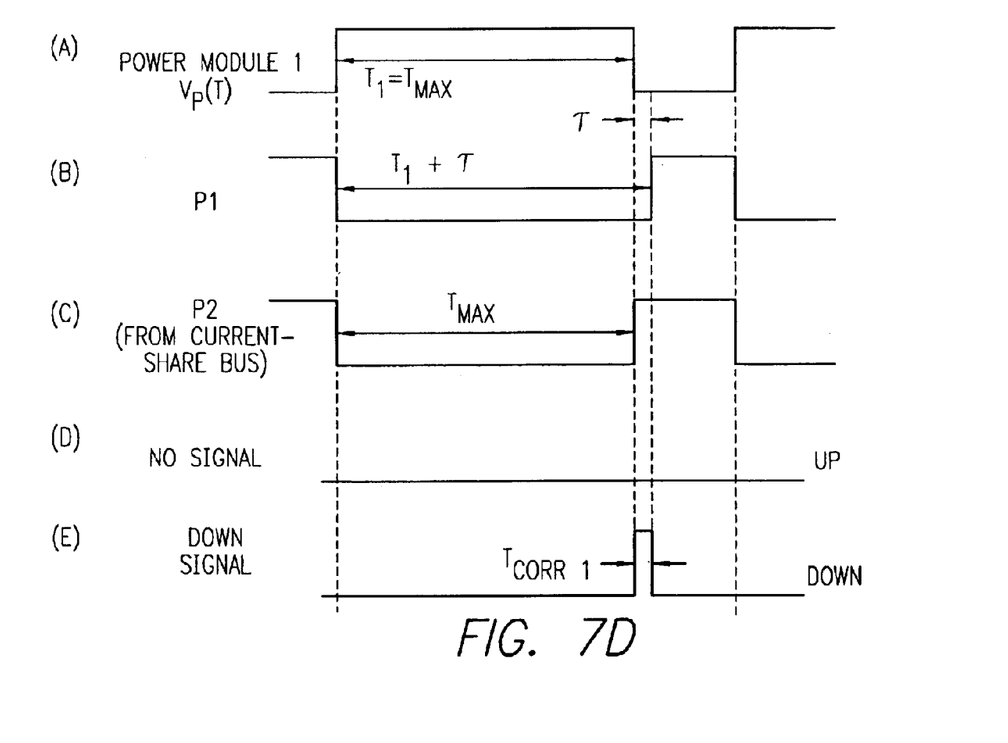

FIGS. 7C and 7D show timing diagrams related to a phase detector according to some embodiments of the present invention. FIG. 7C illustrates a power module that is providing a current below that which is provided by another power module as indicated on bus 200. Waveform (A) shows signal $V_P(t)$ that is indicative of the power modules delivered output current $I_{OUTPUT}$. Waveform (B) shows the first input P1 to phase comparator 400. P1 is the delayed and inverted signal provided by circuitry 360. P1 has a duration of $T_0+\tau$. Waveform (C) shows the second input P2 to phase comparator 400. P2 has a duration of $T_{MAX}$. Waveforms (D) and (E) show the UP and DOWN outputs of phase comparator 400. Since the example shows $T<T_{MAX}$, phase comparator 400 generates only an UP signal with period $T_{CORRO}=T_{MAX}-(T_0+\tau)$.

FIG. 7D illustrates the timing of the power module that is determining the pulse width on bus 200, i.e., the master. Waveform (A) shows signal $V_P(t)$ that indicates the power modules delivered output current $I_{OUTPUT}$. Waveform (B) shows the first input P1 to phase comparator 400. P1 is the delayed and inverted signal provided by circuitry 360. P1 has a duration of $T_1+\tau$. Waveform (C) shows the second input P2 to phase comparator 400. P2 has a duration of $T_1=T_{MAX}$. Waveforms (D) and (E) show the UP and DOWN outputs of phase comparator 400. Since the example shows $T_1=T_{MAX}$, delayed signal P1 has a trailing edge that transitions after the signal on bus 200 transitions. Phase comparator 400 thus generates a short DOWN pulse, which will be provided to loop filter 450.

Figure 8:
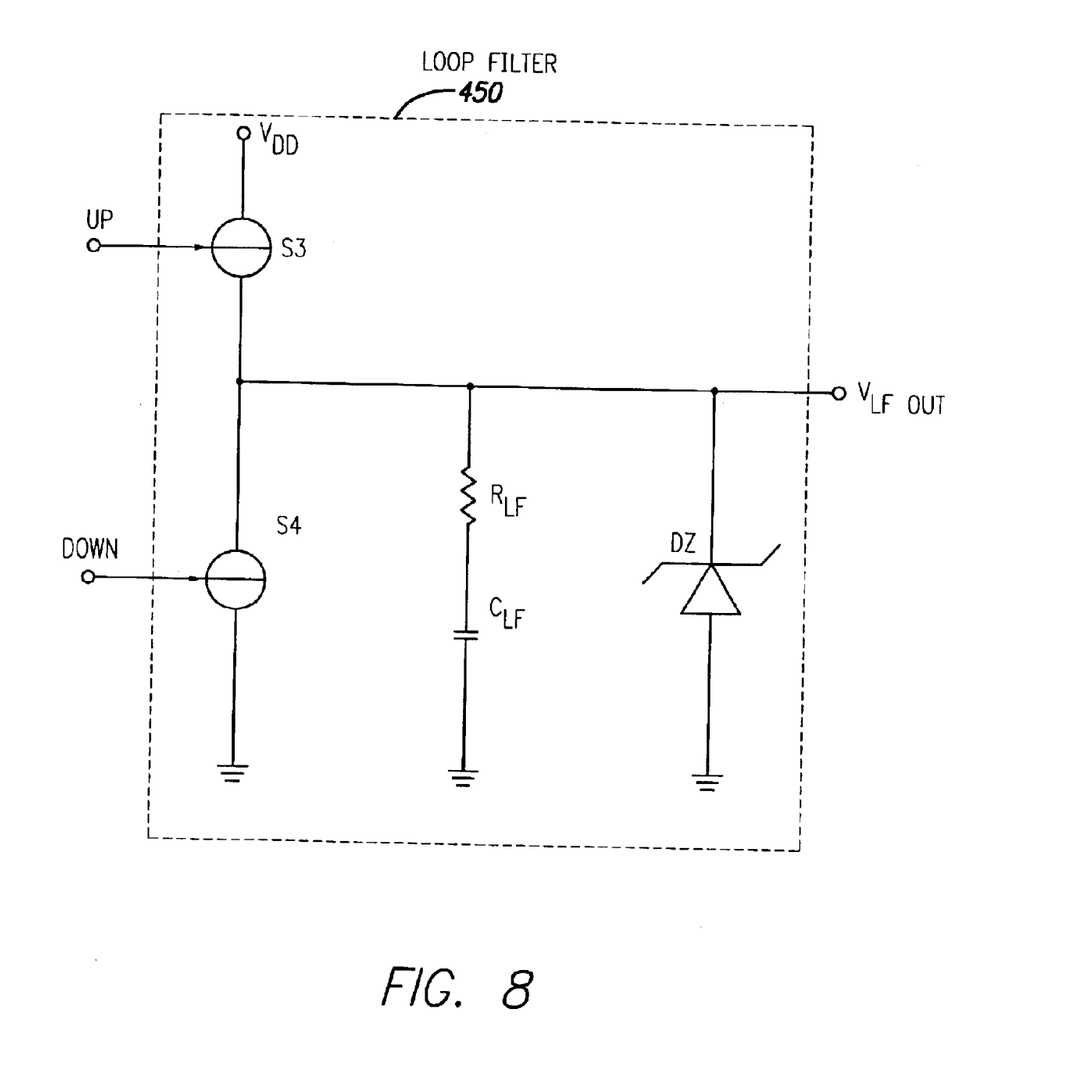
FIG. 8 shows schematically a loop filter according to some embodiments of the present invention.

FIG. 8 shows schematically a loop filter according to some embodiments of the present invention. Loop filter 450 includes a switchable current source S3 coupled to a power source, e.g., $V_{DD}$, and to a center node. Loop filter 450 also includes a second switchable current source S4 coupled between the center node and a common ground. A loop filter resistor $R_{LF}$ and a loop filter capacitor $C_{LF}$ are coupled in series between the center node and the common ground in parallel to S4 and a zener diode DZ also coupled between the center node and ground. The center node is provided as the output $V_{LF\ OUT}$ Of loop filter 450. Loop filter capacitor $C_{LF}$ holds a charge to indicate the proper feedback signal. When loop filter 450 receives an UP pulse, switchable current source S3 temporarily injects current into the center node to charge $C_{LF}$ and raise the output voltage $V_{LF\ OUT}$. On the other hand, when loop filter 450 receives a DOWN pulse, switchable current source S4 temporarily drains current from the center node, thereby removing charge from $C_{LF}$ and lowering the output voltage $V_{LF\ OUT}$. The zener diode DZ is used to limit the maximum output voltage $V_{LF\ OUT}$. Typically the output voltage $V_{LF\ OUT}$ is limited such to limit the maximum rise of the output voltage provided by the power regulator 110 to a range from 5 to 10%.

When capacitor $C_{LF}$ is totally discharged, the output voltage $V_{LF\ OUT}$ is zero and current sink 480 draws no current. If current sink 480 draws no current, the voltage divider of power regulator 110 (as shown in FIG. 6) is not affected by the feedback loop. There is only a feedback signal when charge exists on capacitor $C_{LF}$.

Having thus described a preferred embodiment of a current share method and apparatus, it should be apparent to those skilled in the art that certain advantages of the invention have been achieved. It should also be appreciated that various modifications, adaptations, and alternative embodiments thereof may be made within the scope and spirit of the present invention. The invention is further defined by the following claims.

What is claimed is:

1. A power module comprises:
    a power regulator providing an output signal on a corresponding output terminal;
    a bus interface adapted to communicate with a current share bus; and
    a feedback loop adapted to sense a current level of said output power signal and provide a feedback signal to said power regulator in response thereto, said feedback signal thereby controlling said power regulator to regulate said output signal, said feedback loop comprising a converter adapted to provide a first signal having a pulse width corresponding to said sensed current level, said feedback loop further comprising an error controller adapted to detect a phase difference between said first signal and a second signal received from said bus interface from said current share bus;
    wherein, said feedback loop imparts said first signal onto said current share bus if said first signal has a pulse width greater than corresponding first signals of other power modules communicating with said current share bus, whereupon said first signal becomes said second signal.

2. The power module of claim 1, wherein said feedback loop further comprises a current sensor providing a sensed signal having an amplitude indicative of a current characteristic of the output signal.

3. The power module of claim 1, wherein said converter further comprises an amplitude-to-pulse width converter.

4. The power module of claim 2, wherein the converter comprises:
    a signal generator providing a periodic signal;
    an amplifier coupled to the current sensor to receive the sensed signal and produce an amplified sensed signal; and
    a comparator that compares the periodic signal to the amplified sensed signal and generates the first signal in response thereto.

5. The power module of claim 4, wherein the signal generator comprises a saw-tooth generator.

6. The power module of claim 1, wherein the bus interface comprises a switch coupled to said converter, wherein the switch couples the current share bus to a first reference voltage during said pulse width of said first signal, the current share bus otherwise being coupled to a second reference voltage between successive pulses of said first signal.

7. The power module of claim 6, wherein said switch comprises a transistor having a gate terminal coupled to said converter, a source terminal coupled to ground, and a drain terminal coupled to said current share bus.

8. The power module of claim 6, wherein said first reference voltage further comprises ground and said second reference voltage further comprises a positive voltage.

9. The power module of claim 1, wherein the error controller comprises:
a phase comparator coupled to the converter and to the bus interface to receive the respective first and second signals, said phase comparator comparing the first and second signals to generate an up signal and a down signal;
a loop filter coupled to the phase comparator to receive the up and down signals, said loop filter adjusting a voltage level in response to the up and down signals; and
a current sink coupled to the loop filter, said current sink providing said feedback signal to the power regulator in response to the voltage level from the loop filter.

10. The power module of claim 1, further comprising a delay circuit coupled between the converter and the error controller, said delay circuit delaying at least one transition edge of said first signal from the converter and providing a delayed first signal to the controller.

11. The power module of claim 2, wherein the current sensor is coupled to the output terminal of the power regulator.

12. A power system comprising:
a current share bus; and
a plurality of power modules each having respective output terminals coupled together to provide a common output, each one of the plurality of power modules including:
a power regulator providing an output signal on a corresponding output terminal;
a bus interface adapted to communicate with said current share bus; and
a feedback loop adapted to sense said current level of said output signal and provide a feedback signal to said power regulator in response thereto, said feedback signal thereby controlling said power regulator to regulate said output signal, said feedback loop comprising a converter adapted to provide a first signal having a pulse width corresponding to said sensed current level, said feedback loop further comprising an error controller adapted to detect a phase difference between said first signal and a second signal received from said bus interface from said current share bus;
wherein, said feedback loop imparts said first signal onto said current share bus if said first signal has a pulse width greater than corresponding first signals of other power modules communicating with said current share bus, whereupon said first signal becomes said second signal.

13. The power system of claim 12, wherein said feedback loop further comprises a current sensor sensor providing a sensed signal having an amplitude indicative of a current characteristic of the output signal.

14. The power system of claim 12, wherein said converter further comprises an amplitude-to-pulse width converter.

15. The power system of claim 13, wherein the converter comprises:
a signal generator providing a periodic signal;
an amplifier coupled to the current sensor to receive the sensed signal and produce an amplified sensed signal; and
a comparator that compares the periodic signal to the amplified sensed signal and generates the first signal in response thereto.

16. The power system of claim 15, wherein the signal generator comprises a saw-tooth generator.

17. The power system of claim 12, wherein the bus interface comprises a switch coupled to said converter, wherein the switch couples the current share bus to a first reference voltage during said pulse width of said first signal, the current share bus otherwise being coupled to a second reference voltage between successive pulses of said first signal.

18. The power system of claim 17, wherein said switch comprises a transistor having a gate terminal coupled to said converter, a source terminal coupled to ground, and a drain terminal coupled to said current share bus.

19. The power system of claim 17, wherein said first reference voltage further comprises ground and said second reference voltage further comprises a positive voltage.

20. The power system of claim 12, further comprising a delay circuit coupled between the converter and the error controller, said delay circuit delaying at least one transition edge of said first signal from the converter and providing a delayed first signal to the controller.

21. The power system of claim 13, wherein the current sensor is coupled to the output terminal of the power regulator.

22. The power system of claim 12, wherein the error controller comprises:
a phase comparator coupled to the converter and to the bus interface to receive the respective first and second signals, said phase comparator comparing the first and second signals to generate an up signal and a down signal;
a loop filter coupled to the phase comparator to receive the up and down signals, said loop filter adjusting a voltage level in response to the up and down signals; and
a current sink coupled to the loop filter, said current sink providing said feedback signal to the power regulator in response to the voltage level from the loop filter.

23. A method of sharing current among a plurality of power modules, comprising:
sensing a characteristic of an output signal of at least one of said plurality of power modules;
providing a first signal having a pulse width corresponding to said sensed characteristic;
imparting said first signal onto a current share bus coupled to each of said plurality of power modules if said first signal has a pulse width greater than corresponding first signals of other power modules coupled to said current share bus, whereupon one of said first signals from said plurality of power modules having greatest pulse width is imparted onto said current share bus as a second signal;
detecting a phase difference between said first signal and said second signal; and
providing a feedback signal to said at least one power module in response to said detected phase difference, said feedback signal thereby controlling said at least one power module to achieve current sharing among said plurality of power modules.

24. The method of claim 23, wherein the step of sensing a characteristic of the output signal comprises sensing current of the output signal.

25. The method of claim 23, wherein the step of providing a first signal further comprises delaying at least one transition edge of said first signal.

26. The method of claim 23, wherein the step of detecting a phase difference comprises:
  comparing a duration of time between an end of the first signal and an end of the second signal; and
  adjusting said feedback signal to increase said output power signal if the end of the first signal occurs before the end of the second signal.

27. The method of claim 23, further comprising providing a synchronization signal to said plurality of power modules to initiate said step of providing a first signal.

28. The method of claim 23, wherein said step of providing a synchronization signal further comprises deriving said synchronization signal from said current share bus from a leading edge of one of said first signal and said second signal.

29. The power module of claim 1, wherein a leading edge of said first signal provides a synchronization signal to said other power modules communicating with said current share bus.

30. The power module of claim 1, wherein said feedback loop imparts a synchronization signal onto said current share bus.

31. The power system of claim 12, wherein a leading edge of said first signal provides a synchronization signal to other ones of said plurality of power modules communicating with said current share bus.

32. The power system of claim 12, wherein one of said plurality of power modules imparts a synchronization signal onto said current share bus.

33. The method of claim 23, further comprising imparting a synchronization signal onto said current share bus.

34. The method of claim 33, wherein said synchronization signal further comprises a leading edge of said first signal.

* * * * *